(12) United States Patent
Silvers et al.

(10) Patent No.: US 7,814,128 B2
(45) Date of Patent: Oct. 12, 2010

(54) MULTI-VOLUME FILE SUPPORT

(75) Inventors: Charles H. Silvers, Santa Clara, CA (US); Ronald S. Karr, Palo Alto, CA (US); John A. Colgrove, Los Altos, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1606 days.

(21) Appl. No.: 10/449,739

(22) Filed: May 30, 2003

(65) Prior Publication Data
US 2005/0010620 A1 Jan. 13, 2005

(51) Int. Cl.
*G06F 17/30* (2006.01)
(52) U.S. Cl. ........................ 707/812; 711/154
(58) Field of Classification Search .............. 707/205, 707/200, 10, 1, 100, 809, 812, 813, 822, 707/823; 711/100, 154, 158, E12.001, E12.002, 711/E12.005, E12.006
See application file for complete search history.

(56) References Cited

U.S. PATENT DOCUMENTS

| | | | |
|---|---|---|---|
| 5,018,060 A | | 5/1991 | Gelb et al. |
| 6,170,009 B1 | | 1/2001 | Mandal et al. |
| 6,542,910 B2 | * | 4/2003 | Cork et al. .................. 707/205 |
| 6,636,879 B1 | * | 10/2003 | Doucette et al. ............ 707/205 |
| 6,735,603 B2 | * | 5/2004 | Cabrera et al. .............. 707/200 |
| 6,745,207 B2 | * | 6/2004 | Reuter et al. ................ 707/200 |
| 6,782,389 B1 | * | 8/2004 | Chrin et al. ................... 707/10 |
| 6,912,537 B2 | * | 6/2005 | Selkirk et al. ............... 707/100 |
| 6,952,698 B2 | * | 10/2005 | Delaire et al. .................. 707/10 |
| 2002/0049912 A1 | | 4/2002 | Honjo et al. |
| 2003/0225800 A1 | | 12/2003 | Kavuri |
| 2003/0225801 A1 | | 12/2003 | Devarakonda et al. |
| 2004/0078334 A1 | | 4/2004 | Malcolm et al. |
| 2004/0186858 A1 | * | 9/2004 | McGovern et al. .......... 707/200 |
| 2005/0187985 A1 | * | 8/2005 | Edwards et al. ............. 707/200 |

OTHER PUBLICATIONS

"Veritas File System 3.5," Veritas Software Corporation, Oct. 2002, (58 pages).
Shinkai et al., "HAMFS File System," 1999 IEEE, 1999, (pp. 190-201).
PCT International Application PCT/US2004/018635, International Search Report dated Jun. 6, 2005.

(Continued)

*Primary Examiner*—Greta L Robinson
(74) *Attorney, Agent, or Firm*—Lawrence J. Merkel; Meyertons, Hood, Kivlin, Kowert & Goetzel, P.C.

(57) ABSTRACT

A computer accessible medium comprises instructions which, when executed, receive a request to allocate one or more blocks for a file. At least one allocation policy is assigned to the file, wherein the allocation policy specifies one or more storage units on which the blocks are to be allocated. Additionally, if more than one storage unit is specified, the allocation policy includes a control indication indicating a mechanism for selecting among the storage units. The instructions, when executed, may also allocate blocks according to the allocation policy. In another implementation, a computer accessible medium comprises instructions which, when executed receive a request to allocate one or more blocks for a file in a filesystem and allocate blocks according to an allocation policy. Allocation policies are specifiable at two or more levels of granularity in the filesystem.

34 Claims, 9 Drawing Sheets

OTHER PUBLICATIONS

Veritas Software Corporation, "File System," White Paper, Nov. 1996, 17 pages.

Philip Trautman, SGI, "Scalability and Performance in Modern Filesystems," White Paper, 2000, 14 pages.

Digital Equipment Corporation, "Advanced File System and Utilities for Digital UNIX, Guide to File System Administration," Version 4.0, Apr. 1996, 158 pages.

Compaq, "Advanced File System Quick Reference," Jan. 2002, 66 pages.

"Cluster File System: HAMFS" (Supplemental Explanation of Reference 1), Jul. 1999, pp. 1-2.

"System for Assigning File Block and Recording Medium for Recording File Block Assigning Control Program," JP11184739, Jul. 9, 1999, Kitani Shigeo, et al., Abstract.

"Memory Division Management System," JP2001051855, Feb. 23, 2001, FukuShima Norihiro, et al., Abstract.

Office action from Application No. JP2006-509097 mailed Jan. 4, 2010, 2 pages.

Office Action from Application No. 04776479.0-1245 / 1634161, mailed Jun. 3, 2009, 5 pages.

* cited by examiner

| |
|---|
| Add Volume |
| Remove Volume |
| Resize Volume |
| Create Allocation Policy |
| Delete Allocation Policy |
| Allocation Policy Info |
| Assign Fileset Allocation Policy |
| Assign Filesystem Allocation Policy |
| Assign File Allocation Policy |
| Fileset Allocation Policy Info |
| Filesystem Allocation Policy Info |
| File Allocation Policy Info |
| Encapsulate |

Fig. 12

| Storage Units 132 | Control Indication 134 |

MULTI-VOLUME FILE SUPPORT

BACKGROUND OF THE INVENTION

1. Field of the Invention

This invention is related to the field of filesystems for computer systems and, more particularly, to allocation of storage space to files within the filesystem.

2. Description of the Related Art

Computer systems implement a filesystem to manage the files used by an operating system and/or application programs executing on the computer systems. Filesystem software is executed to manage the files in the filesystem. In the past, filesystems were typically implemented with a single volume namespace, and thus all files in the filesystem have the same storage characteristics (e.g. type of storage device, reliability characteristics, etc.). Different volumes may have different performance characteristics, different costs, and different reliability characteristics. However, some files may be considered "more important" than others, and thus higher reliability characteristics may be desired for these files (even at the expense of lower performance characteristics). Other files may be frequently accessed and updated, and thus high performance characteristics may be desired (even at the expense of lower reliability characteristics). Additionally, files may have both data (the information stored in the file) and metadata (information about the data). Metadata is often considered "more important" than data, and thus higher reliability characteristics may be desired. With a single volume namespace, providing different performance, reliability, and/or cost characteristics for different files, or different portions of files, may not be possible.

Some limited attempts to provide flexibility have been made. For example, the XFS file system from Silicon Graphics, Inc. (SGI) is used in real time critical applications such as video servers, video editing, etc. The XFS filesystem provides a real time space and a "normal" (non-real time space), and attempts to provide real time access to data in the real time space (potentially at the expense of access to the normal space). The QFS filesystem permits separation of storage devices into two pools, one for storing data and the other for storing metadata. Thus, data or metadata is automatically stored on a device in the corresponding pool. Other filesystems (e.g. ADVFS from Digital Equipment Corporation, later acquired by Compaq Computer, which was acquired by Hewlett-Packard) incorporated the functionality of a volume manager, providing characteristics such as mirroring, striping, Redundant Arrays of Inexpensive Disks (RAID), etc. directly in the filesystem.

Filesystems generally do not have the flexibility to allocate files to volumes having the desired characteristics for the file, nor to allocate file data and file metadata with the flexibility that may be desired.

SUMMARY OF THE INVENTION

In one embodiment, a computer accessible medium may comprise instructions which, when executed, receive a request to allocate one or more blocks for a file. At least one allocation policy is assigned to the file, wherein the allocation policy specifies one or more storage units on which the blocks are to be allocated. Storage units may include volumes, in some embodiments, or storage devices, in other embodiments. Additionally, if more than one storage unit is included in the one or more storage units, the allocation policy includes a control indication indicating a mechanism for selecting among the storage units. The instructions, when executed, may also allocate blocks according to the allocation policy. Different allocation policies may be assigned to different files, permitting flexibility in assigning files to storage units. For example, different files may be assigned to volumes having different performance, reliability, and cost characteristics, in some implementations.

In another embodiment, a computer accessible medium comprises instructions which, when executed receive a request to allocate one or more blocks for a file in a filesystem and allocate blocks according to an allocation policy. Allocation policies are specifiable at two or more levels of granularity in the filesystem. For example, in some cases, allocation policies may be specified at the extent, file, directory, fileset, and/or filesystem levels. In some embodiments, allocation policies may be changed during operation. Subsequent block allocations may occur according to the new allocation policy. Viewed in another way, block allocations may be performed according to the allocation policy or policies in effect at the time of the allocation.

BRIEF DESCRIPTION OF THE DRAWINGS

The following detailed description makes reference to the accompanying drawings, which are now briefly described.

FIG. 12 is a table illustrating one embodiment of commands that may be used with regard to allocation policies.

FIG. 16 is a block diagram of one embodiment of an allocation policy.

Figure 1:
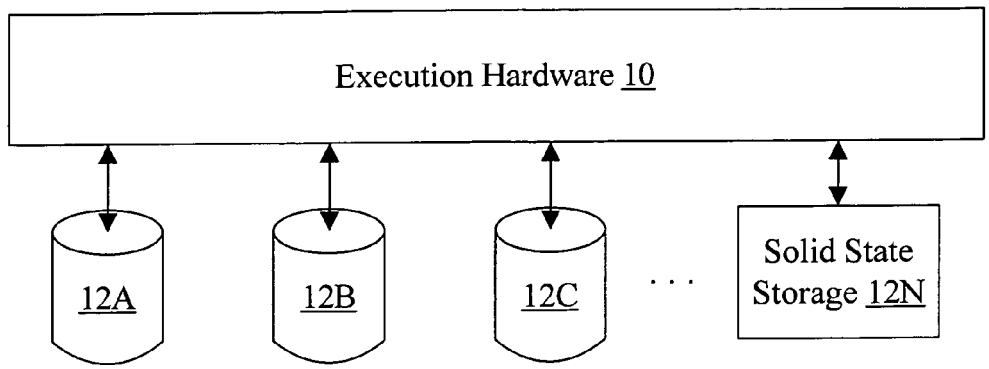
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

System Overview

FIG. 1 is a block diagram of one embodiment of a system. In the embodiment of FIG. 1, the system includes execution hardware 10 and a plurality of storage devices 12A-12N coupled to the execution hardware 10.

The execution hardware 10 may comprise at least one processor designed to execute instructions during use. Multiple processors may be included in some embodiments. The execution hardware 10 may optionally include other components (e.g. a system memory for storing instructions for execution by the processor and data to be operated upon by the processor, various input/output (I/O) devices, etc.).

The storage devices 12A-12N may include any type of computer accessible media. For example, the storage devices 12A-12N may include, in various embodiments, small computer system interface (SCSI) disks, integrated drive electronics (IDE) disks, personal computer memory card international association (PCMCIA) disks, universal serial bus (USB) disks, Firewire disks, etc. The storage devices 12A-12N may further include solid state storage (e.g. storage 12N), which may include various nonvolatile memory devices such as battery-backed random access memory (RAM), Flash memory, various programmable read-only memories (PROMs) such as erasable PROMs (EPROMs), electrically erasable PROMs (EEPROMs), etc. The storage devices 12A-12N may still further include removable storage such as floppy disks. The storage devices 12A-12N may be coupled to the execution hardware 10 via various peripheral interconnects (e.g. IDE, peripheral component interconnect (PCI), USB, serial or parallel interfaces, etc.). Alternatively, the storage devices 12A-12N may be coupled to the execution hardware via a network (wired or wireless). The storage devices 12A-12N may be configured into a storage area network (SAN) or may be network attached storage (NAS), in some embodiments. A combination of directly attached storage devices and networked storage devices may be used in various embodiments.

Figure 2:
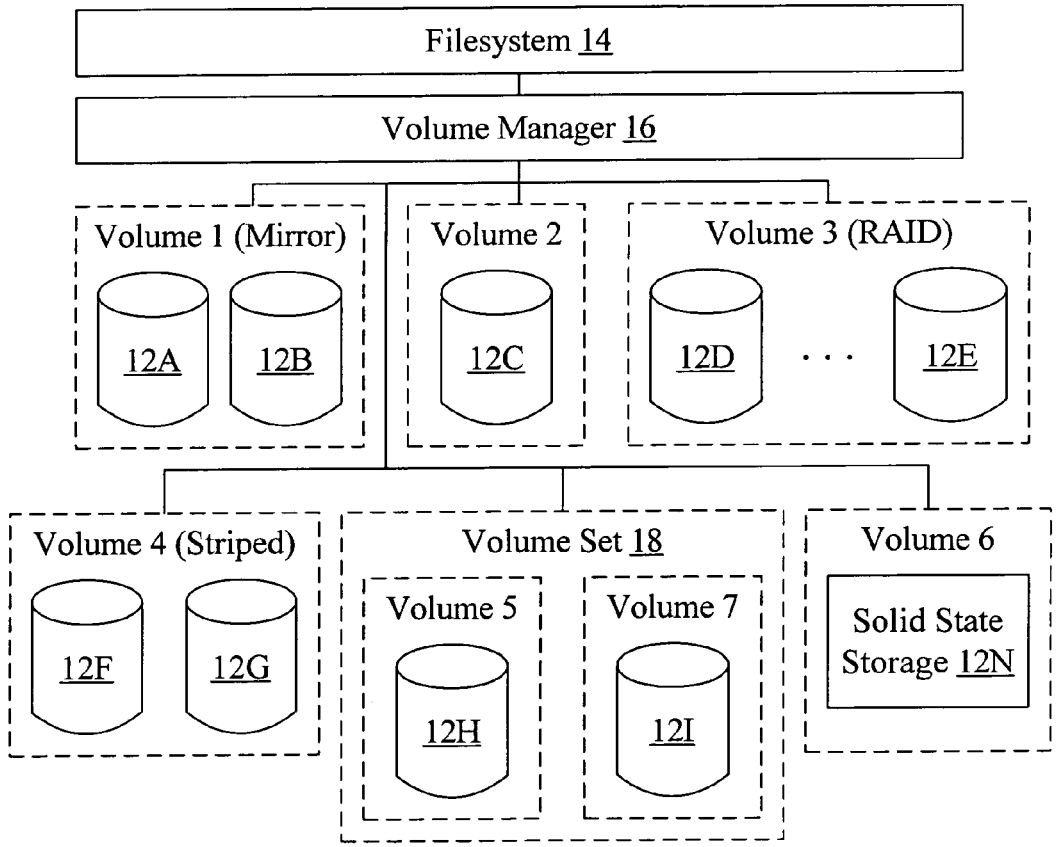
FIG. 2 is a block diagram of one embodiment of a filesystem, a volume manager, and a variety of volumes or volume sets.

FIG. 2 is a block diagram illustrating certain software infrastructure that may be employed in the some embodiments of the system shown in FIG. 1. In the embodiment of FIG. 2, a filesystem 14, a volume manager 16, and volumes that include storage devices 12A-12N are shown. The filesystem and volume manager software may be executed, during use, on the execution hardware 10.

Generally, the volume manager 16 comprises software that organizes the storage devices 12A-12N into volumes (and/or volume sets), and makes the volumes available to the filesystem 14 for storage of files. Various volumes may have different characteristics (e.g. different performance characteristics, different reliability characteristics, etc.). As used herein, the term "volume" refers to a collection of storage blocks on one or more storage devices 12A-12N that are organized and referred to as a unit. A volume may comprise all the blocks of a storage device, a portion of the blocks of a storage device (e.g. a disk partition), all the blocks of multiple storage devices, or a portion of the blocks on each of multiple storage devices. As used herein, a "storage block", or more briefly a "block" may be the minimum unit of allocation of storage space on a storage device (or within a volume). Block sizes may vary from embodiment to embodiment. For example, a block size of 4 kilobytes is common, although any block size may be used.

The organization of the volume may provide certain performance and/or reliability characteristics. For example, volume 1 in FIG. 2 is a mirrored volume including storage devices 12A-12B. The volume manager 16 may write both storage devices 12A-12B with the same data, and thus a failure of one of the devices 12A-12B may not result in loss of data. Accordingly, volume 1 provides mirroring redundancy. Other volumes may include more storage devices to provide additional mirroring of the data, providing additional redundancy (and thus higher reliability). As another example of reliability, volume 3 may include a plurality of storage devices (including devices 12D and 12E in FIG. 2) that the volume manager 16 may manage as RAID storage. For example, RAID level 5 may be implemented in some embodiments. Other embodiments may implement any RAID level. Some of the performance characteristics may be a result of the storage device or devices included in the volume (e.g. different types of devices may have different latency and bandwidth characteristics). Thus, volumes 2 and 6 may have different performance characteristics based on the storage devices 12C and 12N included in the volumes. However, performance characteristics may also be established via volume organization. For example, volume 4 includes storage devices 12F and 12G which are striped to increase performance. In addition to the performance and reliability characteristics, each volume may also have cost characteristics based on the cost of the underlying storage devices. Still further, several volumes may be defined that have the same cost, performance, and reliability characteristics. Different users may use different ones of such volumes, to ensure that the users won't interfere with each other in accessing the volumes (e.g. ensuring that each user may have dedicated bandwidth to the corresponding volume).

The volume manager 16 may also support the creation of volume sets (e.g. the volume set 18 in FIG. 2). As used herein, a "volume set" may be a collection of one or more volumes organized as a single object for access by the filesystem 14. Volumes within the volume set may be addressed by the filesystem 14 using the volume set name and an index of the desired volume within the volume set. Volumes within the volume set may have different characteristics (e.g. volume 5 and volume 7 within the volume set 18 may have different characteristics).

Generally, the filesystem 14 may comprise software that organizes and tracks files used by higher level software (e.g. the operating system, application programs, etc.). The filesystem 14 may provide hierarchical organization of the files into directories, and manages allocation of storage space for the files. In the embodiment of FIG. 2, the filesystem 14 may allocate blocks on one or more volumes provided by the volume manager 16 to store file data (and file metadata). In other embodiments, the filesystem 14 may allocate blocks directly on various storage devices 12A-12N, if the volume manager 16 is not included. In such embodiments, each storage device 12A-12N may be treated in a manner similar to a volume by the filesystem 14. All data stored in the filesystem (e.g. file data, metadata, etc.) may be referred to as filesystem data herein.

Allocation Policies

The filesystem 14 may provide for specifying various allocation policies for the filesystem. Generally, an "allocation policy" may specify one or more storage units that may be used for allocation. The storage units may include volumes (including volumes within volume sets), in embodiments that implement the volume manager 16. The storage units may include storage devices 12A-12N in embodiments that do not implement the volume manager 16. For simplicity in the remainder of the discussion, allocation policies will be discussed as specifying one or more volumes. However, other embodiments may have one or more storage devices and similar operation may apply, substituting "storage device" for "volume" (or, more generally, substituting "storage unit" for "volume"). Additionally, if the allocation policy specifies more than one storage unit, the allocation policy may include a control indication that indicates the mechanism for selecting among the storages. In some embodiments, a variety of other control flags may be provided (e.g. an indication of whether or not a non-privileged user may assign the policy to a file, an indication of whether or not the policy is to be strictly followed for all allocations, etc.). An allocation policy may also be encoded as "null", which means that the allocation policy is unspecified. A default allocation policy may be used to allocate blocks, or allocation policies specified at other levels of granularity may be used, in various embodiments. FIG. 16 illustrates one embodiment of an allocation policy 130. As shown in FIG. 16, the allocation policy 130 includes a storage units field 132 that identifies the storage units specified by the allocation polity 130 and a control indication field 134 that stores the control indication that indicates the mechanism for selecting among the storage units.

The filesystem 14 may apply the allocation policy when allocating blocks for a file. That is, the filesystem 14 may allocate blocks on a volume specified by the allocation policy, and may not allocate blocks on a volume not specified in the allocation policy (even if blocks are available on a volume that is not specified in the allocation policy). Allocation policies may be used to control which volumes are used for a given file, and thus may provide flexibility to the user of the filesystem 14 in controlling the performance, cost, and reliability characteristics of the storage on which various files are stored, in some embodiments. In some embodiments, the volumes may have one or more characteristics that are assigned by an administrator. Such assigned characteristics may, e.g., identify volumes based on information that is external to the volume and known to the administrator. For example, the administrator may assign characteristics that identify the location of the volume, the traffic expected on the network to/from the volume, etc. Allocation policies may be defined to control allocation based on such assigned characteristics. The assigned characteristics may be represented in any fashion (e.g. name/value pairs).

In one embodiment, allocation policies may be assigned individually to files. That is, each file may have an assigned allocation policy or policies. For example, a file may be described by one or more inodes, in one embodiment. Generally, as used herein, an "inode" may comprise a data structure that describes a file. The nodes are stored in the filesystem, and are used to identify the files in the filesystem. The modes may store the allocation policy or policies assigned to the file (or may store a label identifying the allocation policy, and the allocation policy itself may be stored in an allocation policy data structure). Thus, each file may have an allocation policy, and the allocation policies for different files may differ. Still further, modes for file data and inodes for file metadata may be separate in some embodiments. Thus, allocation policies for file data and file metadata may differ. For example, file metadata may be stored on volumes having higher reliability characteristics than the corresponding file data. There may be separate inodes for different types of file metadata as well, permitting allocation policies to differ for different types of metadata. Generally, metadata may be data that describes the file (or the data in the file). For example, directory information may be metadata. Various extended file attributes (used by higher level software such as the operating system or application programs) may be stored as metadata. Symbolic links to files may be metadata. Any metadata may be provided, in various embodiments. Allocation policies may also be assigned per inode type (e.g. file data inode versus metadata inode, or various types of metadata inodes such as directory data, extended file attributes, symbolic links, etc.).

In another embodiment, allocation policies may be assigned at more than one level of granularity in the filesystem. For example, an allocation policy may be assigned for the filesystem as a whole, for filesets within the filesystem, for directories within the filesystem or fileset, and for files within the filesystem (or fileset). For a given allocation, the allocation policy at the finest level of granularity for the file that is not null may be used. In another embodiment, allocation policies may also be assigned for each extent within a file. As used herein, an "extent" is a set of contiguous blocks within a volume that are allocated to a file. Assigning allocation policies to extents may permit controlling the storage that is added to the extent if the extent is expanded. In yet another embodiment, allocation policies may be assigned to ranges of the file.

It is noted that the filesystem may include one or more filesets. A fileset may be a collection of files that are treated as a unit (similar to the relationship between volume sets and volumes). In some embodiments, filesets may be independent namespaces within a filesystem. In one embodiment, filesets may be used for backup purposes. One of the filesets may be the primary (active) fileset, and other filesets may be clones which snapshot the filesystem state for backup purposes. In such embodiments, filesets may also be referred to as "checkpoints".

The allocation policy or policies may be changed dynamically in operation, as desired. New allocations for the corresponding file may follow the new allocation policy. If desired, the storage for the file may be reallocated after the policy change, so that the new allocation policy is used for the entire file.

Figure 3:
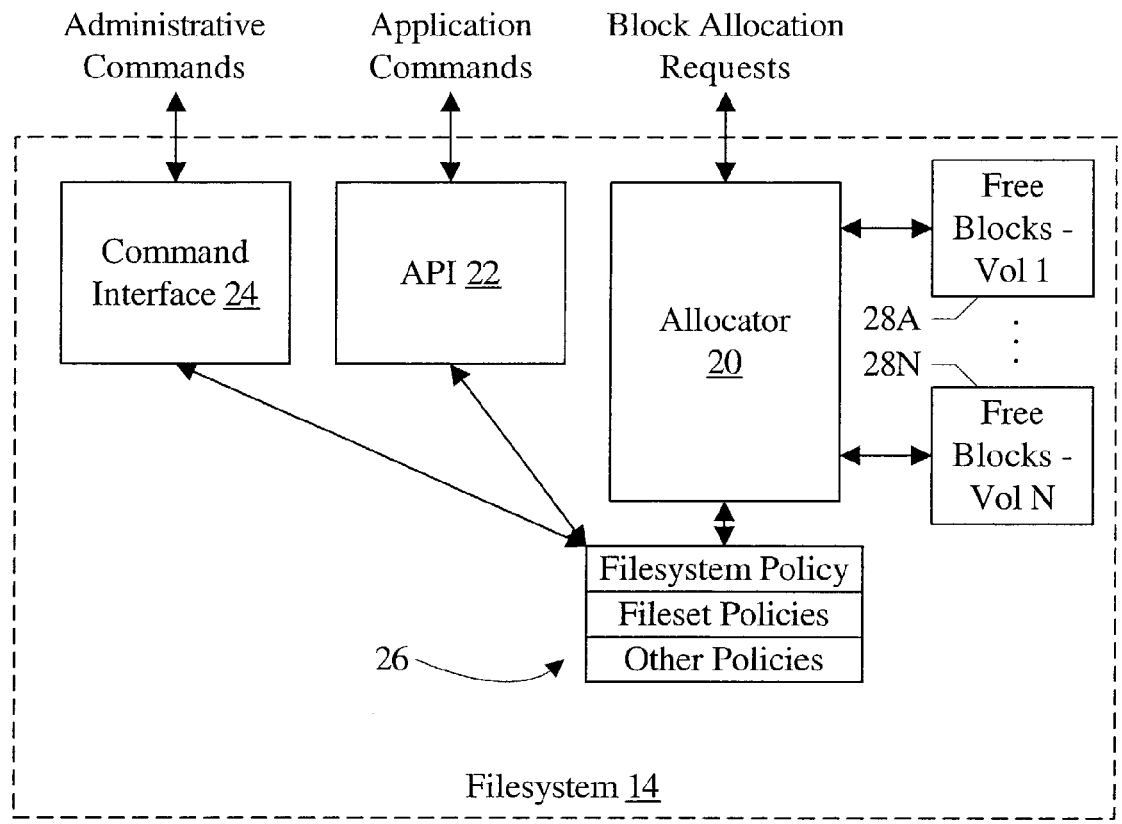
FIG. 3 is a block diagram of one embodiment of filesystem software in more detail.

Turning now to FIG. 3, a block diagram of one embodiment of a portion of the filesystem 14 is shown. In the embodiment of FIG. 3, the filesystem 14 includes an allocator 20, an application programming interface (API) 22, and a command interface 24. The allocator 20, the API 22, and the command interface 24 may have access to a filesystem policy, one or more fileset policies (e.g. one for each fileset in the filesystem), and various other policies that may be defined for assignment to files. Together, the filesystem policy, the fileset policies, and the other policies may form a plurality of allocation policies 26 for the filesystem 14. The plurality of allocation policies 26 may be stored by the filesystem 14 as a data structure (e.g. on one of the volumes in the filesystem 14). The allocator 20 may also have access to a set of data structures defining the free blocks for each volume within the file system (e.g. the free block list for volume 1, reference numeral 28A, and the free block list for volume N, reference numeral 28N, are shown in FIG. 3).

The allocator 20 may comprise instructions which, when executed (e.g. on the execution hardware 10), allocate blocks for file storage in response to block allocation requests. The block allocation requests may be sourced by application programs that are updating files, by the operating system software, etc. The block allocation request may include the allocation policy assigned to the file (or an indication thereof), as well as the number of blocks being requested. Alternatively, the block allocation request may identify the file for which blocks are to be allocated and the allocator 20 may obtain the allocation policy corresponding to the file (e.g. from a data structure accessible to the allocator 20 such as the allocation policies 26). For example, in one embodiment, the block allocation request includes the inode for which blocks are being requested, as well as the number of blocks. The inode may identify the file for which the blocks are being requested, and may also specify the allocation policies assigned to the file. In other embodiments, the allocation policies for files may be stored in a data structure accessible by the allocator 20 (e.g. the allocation policies 26) and thus may not be specified explicitly in the block allocation requests. In such an embodiment, the allocator 20 may use the file identification (e.g. inode) to lookup the allocation policy for the inode.

The allocator 20 may apply the allocation policy for the file to the block allocation request, and may return, to the requester, the number of blocks allocated and a pointer to the blocks. The number of blocks actually allocated may be less than the number of requested blocks (e.g. if the number of blocks are not located as a contiguous group on one of the volumes included in the allocation policy). In such situations, the requester may repeat the request (subtracting the number of allocated blocks from the number of requested blocks) until the number of desired blocks are allocated (or until an error occurs indicating that the blocks may not be allocated). The blocks available for allocation may be indicated by the free block lists 28A-28N, and the allocator may update the free block lists 28A-28N to remove allocated blocks from the lists in response to allocating the blocks for a file. In embodiments in which allocation policies are specified at various levels of granularity, the allocator 20 may apply the allocation policy that is at the finest level of granularity applicable to the request and that is not null.

The command interface 24 may comprise instructions executed (e.g. on the execution hardware 10) in response to various administrative commands. The administrative commands may be input by a user (e.g. via a command shell). A set of commands pertaining to allocation policies may be implemented (e.g. to add allocation policies, assign the policies, change the policies, etc.). An example set of commands is shown in FIG. 12 and described in more detail below. The API 22 may receive application commands generated by application programs. The application commands may be calls to various software routines in the API 22. The application commands may be a subset of the administrative commands, and may be used by applications (and operating system software) to manage allocation policies. In some embodiments, the set of application commands used for managing allocation policies may be the same as the set of administrative commands. The administrator of the filesystem 14 may control how much permission is provided to applications to manage allocation policies, and the API 22 may enforce any limits on the permissions.

Figure 4:
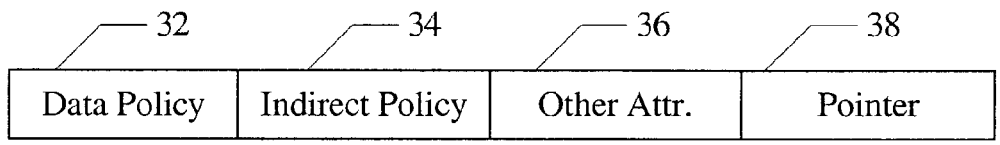
FIG. 4 is a block diagram of one embodiment of an inode.

Turning next to FIG. 4, a block diagram of one embodiment of an inode 30 is shown. In the embodiment of FIG. 4, the inode 30 includes a data policy field 32, an indirect policy field 34, other attributes 36, and a pointer field 38.

The illustrated embodiment provides for two allocation policies per inode via the data policy field 32 and the indirect policy field 34. The data policy specified in the direct policy field 32 may be used for data block requests and the indirect policy specified in the indirect policy field 34 is used for indirect block requests. Thus, for this embodiment, the block allocation request received by the allocator 20 may also include an indication of whether the request is for data blocks or indirect blocks. A data block, as used herein, is a block allocated to store file data (or metadata). An indirect block is a block allocated to store an indication of one or more data blocks or other indirect blocks. Indirect blocks may include any form of file indexing (e.g. pointers to data blocks or other indirect blocks; a bit map identifying the data blocks or other indirect blocks, etc.). It may be desirable to have different allocation policies for data blocks than for indirect blocks. Data blocks may be more frequently allocated in large extents, while indirect blocks may be more frequently allocated as a smaller number of blocks. By using different allocation policies, the indirect block allocations may be less likely to fragment volumes be used for data block allocations. It is noted that the direct policy field 32 and the indirect policy field 34 may store labels identifying one of the allocation policies 26, rather than the actual policy itself. As used herein, an inode may "specify" an allocation policy by either including the allocation policy or by including a label that identifies the allocation policy.

The pointer field 38 may store one or more pointers to blocks. In some embodiments, if the file data is small enough to be stored in the pointer field 38, the file data may be stored instead of a pointer or pointers.

The other attributes 36 may store other information for the file corresponding to the inode (e.g. access permissions, owner, timestamps, etc.). Any other information may be stored, as desired, or no information may be stored. In one embodiment, the other attributes 36 may indicate whether the pointer field 38 includes file data, one or more pointers to data blocks, or one or more pointers to indirect blocks.

Figure 5:
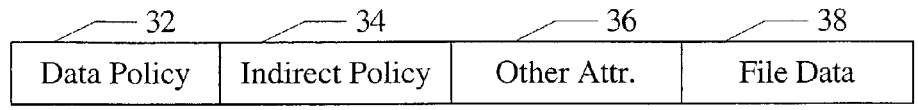
FIG. 5 is block diagram of one embodiment of an inode storing file data.
Figure 6:
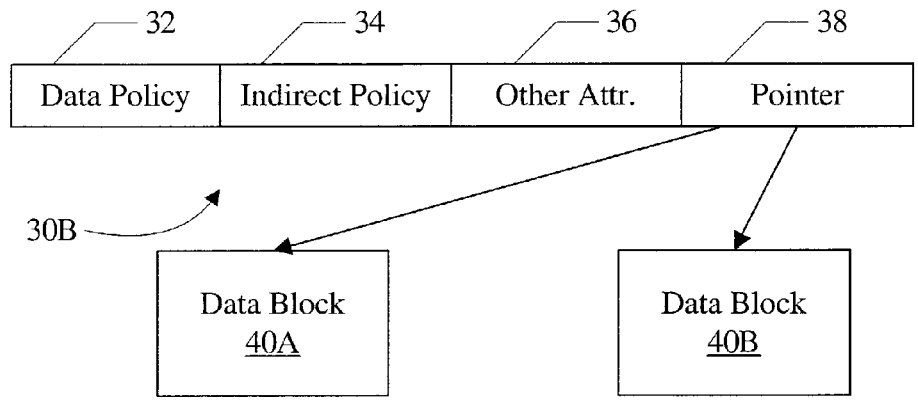
FIG. 6 is a block diagram of one embodiment of an inode storing one or more pointers to data blocks.
Figure 7:
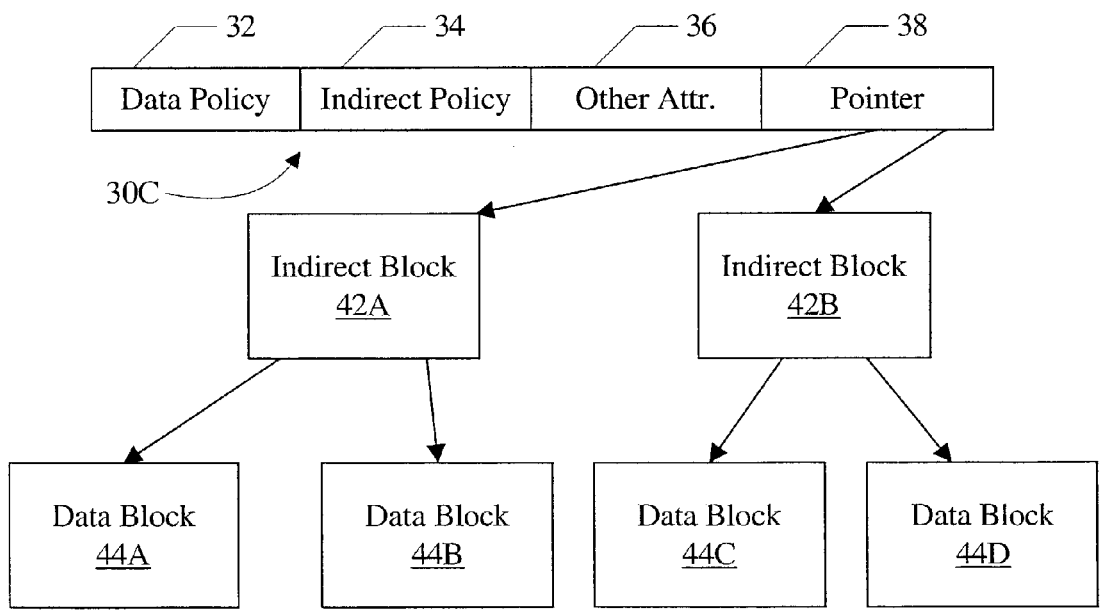
FIG. 7 is a block diagram of one embodiment of an node storing one or more pointers to indirect blocks, each indirect block storing one or more pointers to data blocks.

FIGS. 5, 6, and 7 illustrate various embodiments of inode 30: inode 30A, inode 30B, and inode 30C. Inode 30A may be an example of an inode having the file data stored in the pointer field 38. Inode 30B may be an example of an inode having one or more pointers to data blocks (e.g. blocks 40A and 40B in FIG. 6). Inode 30C may be an example of an inode having one or more pointers to indirect blocks (e.g. indirect block 42A, pointing to data blocks 44A and 44B, and indirect block 42B, pointing to data blocks 44C and 44D). As illustrated in FIGS. 5, 6, and 7, each inode 30A-30C includes the data policy field 32 and the indirect policy field 34.

While two allocation policy fields are shown in the embodiments of FIGS. 4-7, other embodiments are contemplated in which one allocation policy is specified per inode, or in which more than two allocation policies are specified per inode. Additionally, allocation policy fields may be stored elsewhere in various embodiments. For example, allocation policy fields may be stored with other metadata. Allocation policy fields may also be stored in indirect blocks, etc.

Figure 8:
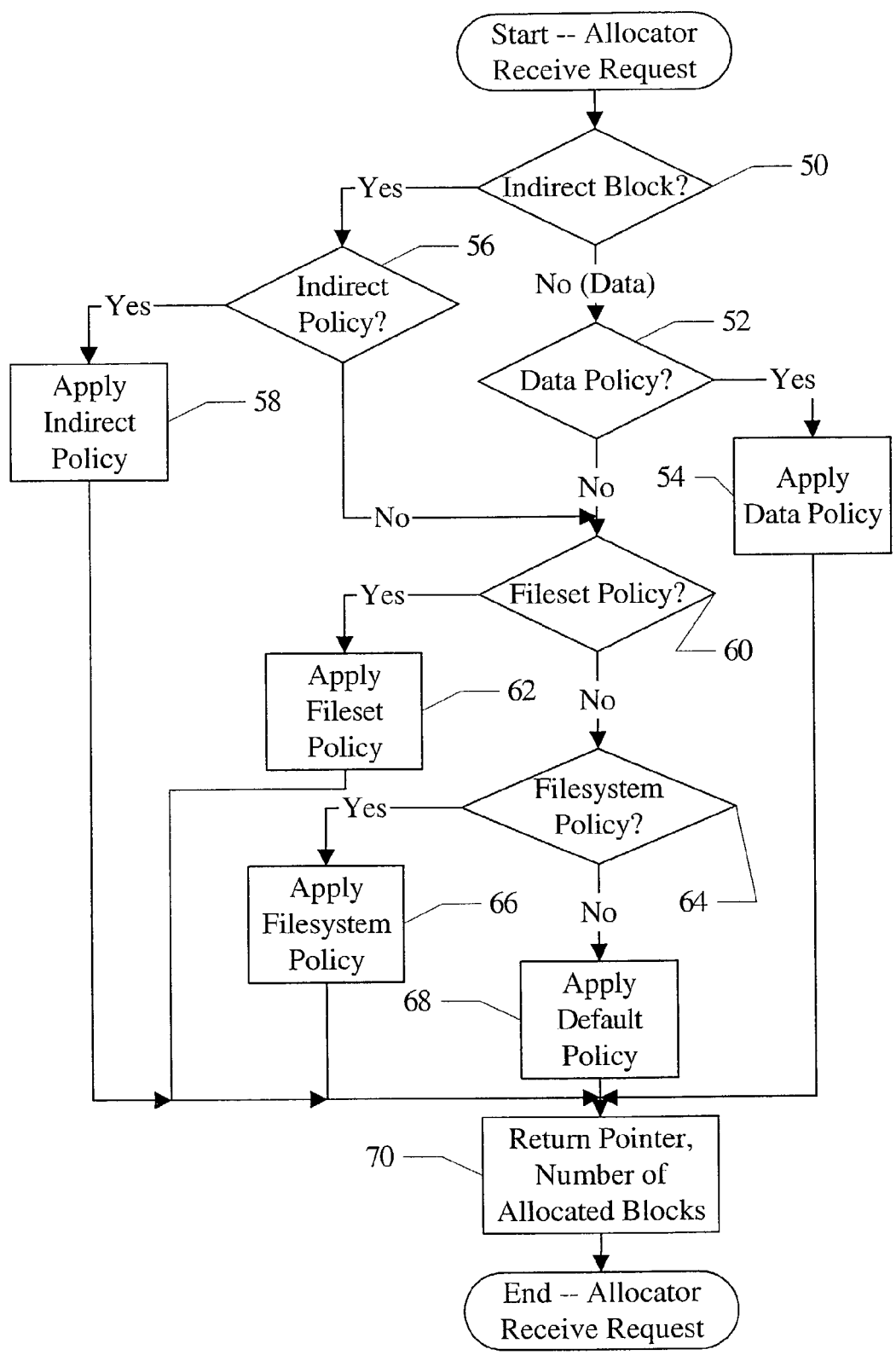
FIG. 8 is a flowchart illustrating operation of one embodiment of an allocator shown in FIG. 7.

Turning now to FIG. 8, a flowchart is shown illustrating operation of one embodiment of the allocator 20 in response to a block allocation request. The embodiment illustrated in FIG. 8 may be used in embodiments in which allocation policies may be established at various levels of granularity. For the illustrated embodiment, allocation policies are provided in the inode (e.g. FIG. 4), and may also be specified at the fileset and filesystem level. The flowchart of FIG. 8 may represent instructions included in the allocator 20 which, when executed, implement the operation shown in FIG. 8.

The allocator 20 may determine if the block allocation request is for a data block (or blocks) or an indirect block (or blocks) (decision box 50). If the request is for a data block, the allocator 20 may check the data policy specified by the inode provided in the request (decision box 52). If the data policy is not null (decision box 52, "yes" leg), the allocator 20 may apply the data policy to allocate the block(s) (box 54). On the other hand, if the request is for an indirect block, the allocator 20 may check the indirect policy specified by the inode provided in the request (decision box 56). If the indirect policy is not null (decision box 56, "yes" leg), the allocator 20 may apply the indirect policy to allocate the block(s) (box 58).

If the request is for indirect block(s) and the indirect policy specified by the inode is null, or if the request is for data block(s) and the data policy specified by the inode is null, the allocator 20 may check the fileset policy for the fileset including the file (decision box 60). If the fileset policy is not null (decision box 60, "yes" leg), the allocator 20 may apply the fileset policy to allocate the block(s) (box 62). Similarly, if the fileset policy is null, the allocator 20 may check the filesystem policy (decision box 64). If the filesystem policy is not null (decision box 64, "yes" leg), the allocator 20 may apply the filesystem policy to allocate the block(s) (box 66). If the fileset policy is null (decision box 64, "no" leg), then the allocator 20 may apply a default policy (box 68). The default policy may be any desired policy. For example, the default policy may be to allocate blocks on any volume attached to the filesystem.

The allocator 20 returns a pointer to the allocated block(s) and a number of blocks allocated (box 70). As mentioned above, in some cases, fewer then the requested number of blocks may be allocated for a given request. If no blocks may be allocated for a given request, an error may be returned instead.

The embodiment of FIG. 8 illustrates separate data and indirect policies at the inode (file) level of granularity and one policy at coarser levels of granularity (e.g. fileset and filesystem levels). In other embodiments, the coarser levels of granularity may have separate data and indirect policies as well. In such embodiments, the indirect or data policy would be selected at each coarser level based on whether the block allocation request is for data block(s) or indirect block(s).

While the illustrated embodiment includes allocation policies at the file, fileset, and filesystem levels of granularity (and a default if no policies are specified), other embodiments may use any subset of the granularities. Other embodiments may implement the extent or file range levels of granularity, in addition to the illustrated levels (or any subset of the illustrated levels).

In other embodiments, the filesystem 14 may not implement multiple levels of granularity for allocation policies (that is, only the file-level policies may be implemented). In such an embodiment, the default policy may be used if the request is for indirect block(s) and the indirect policy specified by the inode is null, or if the request is for data block(s) and the data policy specified by the inode is null.

It is noted that, in another embodiment, the allocator 20 may check only the data policy and indirect policy specified in the inode, depending on the request type. The policies at different granularities may take effect when the file is created. That is, code executing similar to the flowchart of FIG. 8 may be executed during file creation to set the data policy field 32 and the indirect policy field 34 in the inode of the file being created (where a user-specified policy may be assigned, or the fileset or filesystem policies may be used if no user-specified policy is provided).

As mentioned above, various allocation policies may be modified dynamically during use. The flowchart of FIG. 8 may use the allocation policies in effect at the time the block allocation request is received.

Figures 9, 10:
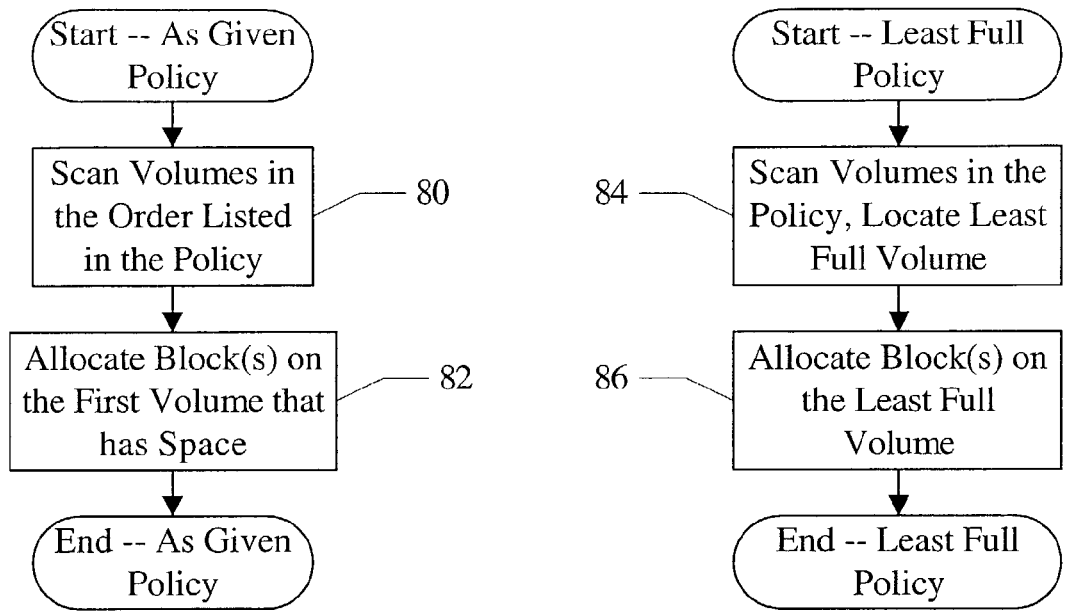
FIG. 9 is a flowchart illustrating one embodiment of applying an "as given" allocation policy.
FIG. 10 is a flowchart illustrating one embodiment of applying an "least full" allocation policy.
Figure 11:
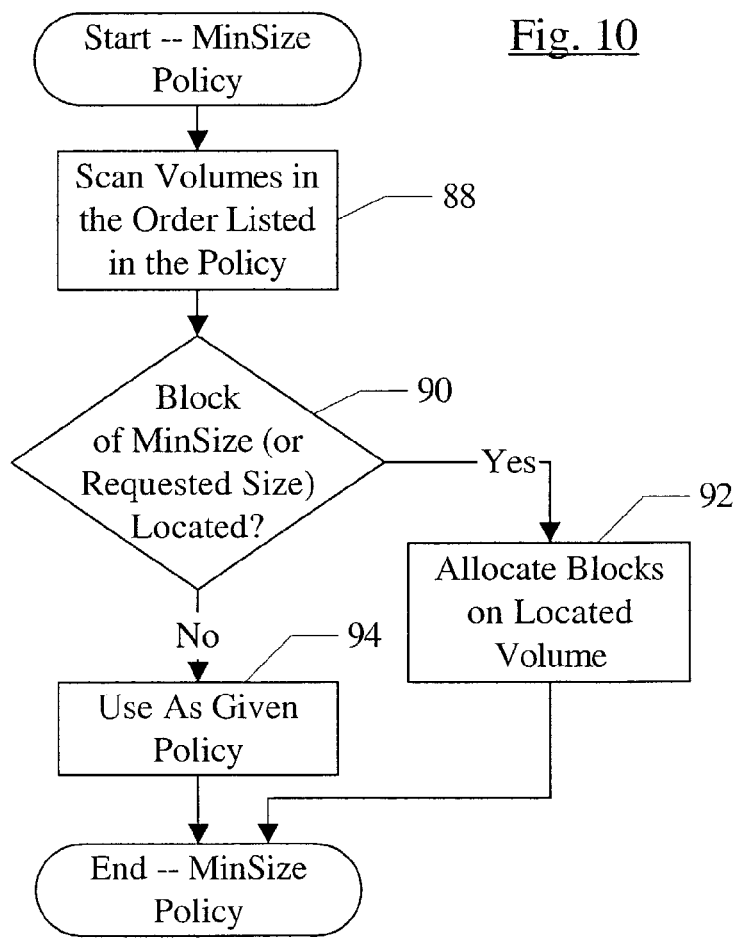
FIG. 11 is a flowchart illustrating one embodiment of applying an "MinSize" allocation policy.

At each of blocks 54, 58, 62, and 66, an allocation policy is applied. Applying an allocation policy may generally include attempting to allocate from the volumes included in the allocation policy, under the control of the control indication if more than one volume is listed. Several examples of applying policies for various control indication encodings are shown in FIGS. 9-11. That is, depending on the control indication in the allocation policy, any of blocks 54, 58, 62, and 66 may be implemented using any of the flowcharts shown in FIGS. 9-11. The flowcharts of FIGS. 9-11 may each represent instructions forming the allocator 20 which, when executed, implement the operation shown in FIGS. 9-11.

FIG. 9 is a flowchart illustrating application of an "as given" policy (that is, the control indication is coded to indicate "as given"). With this policy, an attempt is made to allocate from the volumes in the order that they are listed in the allocation policy. That is, if the first volume in the allocation policy has at least one block available, that block will be allocated in response to the request. If the first volume is full, an attempt to allocate from the second volume in the allocation policy is made, etc.

Thus, the allocator 20 may scan the volumes (more particularly, the allocator 20 may access the free block lists 28A-28N for the volumes) in the order listed in the allocation policy (box 80). The allocator 20 may allocate one or more blocks on the first volume in the allocation policy that has space (box 82).

Alternatively, the allocator 20 may scan the volumes for the requested allocation size (in the order listed in the allocation policy) and may allocate the requested size on the first volume having contiguous blocks of the requested size. If the requested size is not available, the allocator 20 may allocate blocks from the first volume having any blocks available for allocation.

FIG. 10 is a flowchart illustrating application of a "least full" policy (that is, the control indication is coded to indicate "least full"). With this policy, the blocks are allocated on the volume in the allocation policy that is least full (e.g. has the most blocks available, or has the most blocks available as a percentage of the total blocks in the volume, in various embodiments). Thus, the allocator 20 may scan the volumes (more particularly, the allocator 20 may access the free block lists 28A-28N for the volumes) to locate the least full volume (box 84). The allocator 20 may allocate blocks on the least full volume (box 86).

It is contemplated that other criteria than order and fullness may be used to select among the volumes specified in an allocation policy for allocation in response to a block allocation request. For example, fragmentation of the volume may be considered, a desired minimum allocation size provided independent of the block allocation request may be considered, etc. For example, FIG. 11 is a flowchart illustrating application of a "MinSize" policy (that is, the control indication is coded to indicate "MinSize"). With this policy, the allocator 20 attempts to allocate the smaller of the requested size (number of blocks) or a minimum size (number of blocks) from any of the volumes in the allocation policy. The minimum size may be programmable (either globally for the filesystem or within the allocation policy) or may be fixed.

Thus, the allocator 20 may scan the volumes (more particularly, the allocator 20 may access the free block lists 28A-28N for the volumes) in the order listed in the policy (box 88). If a block of the minimum size (or the requested size) is located (box 90, "yes" leg), the allocator 20 may allocate the blocks on the located volume (box 92). If a block of the minimum size (or the requested size) is not located (box 90, "no" leg), the allocator 20 may use the as given policy to allocate blocks (box 94).

Other policies are contemplated as well. For example, a policy is contemplated that combines the "as given" and "MinSize" policies, with a weight to indicate how far to apply one policy before favoring the other policy. Still further, it is contemplated that multiple allocation policies may be applied to subsets of the volumes desired for a given file.

Turning next to FIG. 12, a table of one embodiment of various administrative commands that may be supported by the command interface 24 with regard to allocation policies is shown. A similar set of commands, or a subset, may be supported from the applications via the API 22. Other embodiments may implement any subset of the commands, or other additional commands, as desired. Other additional commands may be supported for other filesystem functions as well.

The add volume command may be used to add a volume to the filesystem. The add volume command may not add the volume to any allocation policies. The remove volume command may be used to remove a volume from the filesystem. The remove volume command may fail of the volume is still specified in one or more allocation policies. The resize volume command may be used to resize the volume (e.g. to increase or decrease the number of blocks in the volume).

The create allocation policy command may be used to create an allocation policy (e.g. to add the new allocation policy to the allocation policies 26). The delete allocation policy command may be used to deleted an allocation policy from the allocation policies 26. The allocation policy info command may be used to retrieve the contents of a specified allocation policy.

The assign fileset allocation policy command may be used to assign the allocation policy or policies for the fileset level of granularity. Similarly, the assign filesystem allocation policy command may be used to assign the allocation policy or policies for the filesystem level of granularity. The corresponding fileset allocation policy info and filesystem allocation policy info commands may be used to retrieve the contents of the policies at the fileset and filesystem levels of granularity, respectively.

The assign file allocation policy command may be used to assign the allocation policies (data and/or indirect) of a file. The file allocation policy info command may be used to retrieve the contents of the policies of the file.

The encapsulate command may be used to create a file with one data extent covering an entire volume. This command may be used to encapsulate a raw volume being used by a database, as described in more detail in the examples section below.

Additionally, in some embodiments, a command may be supported to reallocate a file according to a different allocation policy than the allocation policy assigned to the file. Such a command may be used to reallocate the file according to a different allocation policy without actually changing the file's allocation policy.

Figure 13:
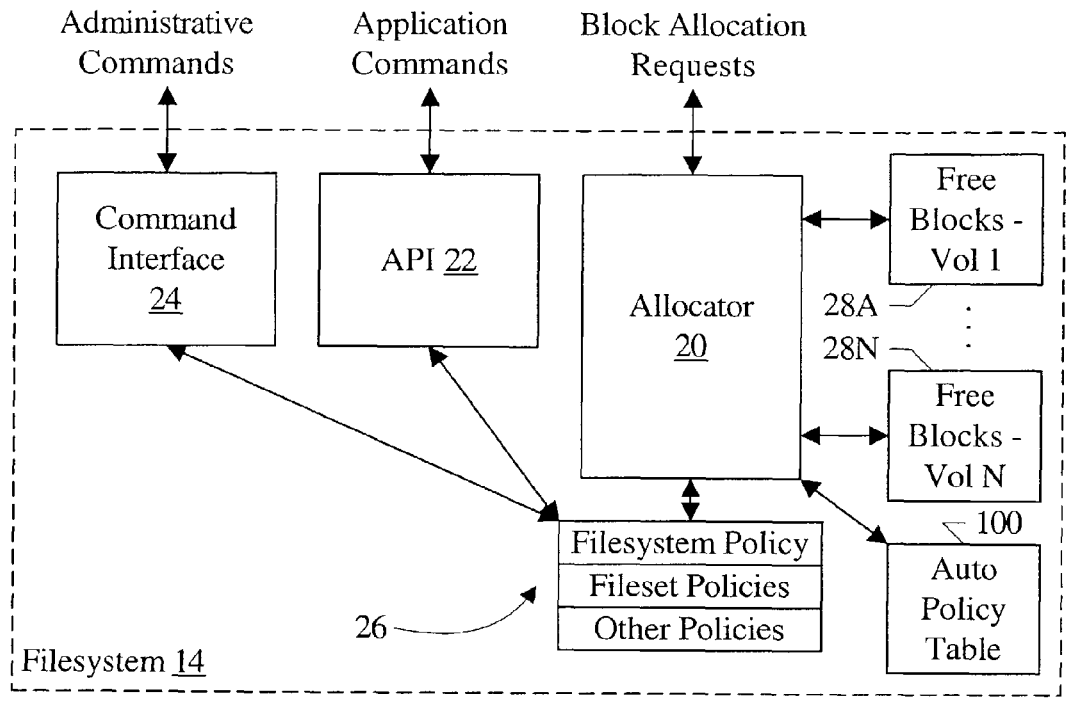
FIG. 13 is a block diagram of a second embodiment of filesystem software in more detail.

Turning now to FIG. 13, a block diagram of a second embodiment of a portion of the filesystem 14 is shown. The embodiment of FIG. 13 illustrates the allocator 20, the API 22, the command interface 24, the allocation policies 26, and the free block lists 28A-28N. Additionally, an auto allocation policy table 100 is shown, accessible by the allocator 20.

The auto allocation policy table 100 may be used to assign an allocation policy for certain files when the files are created. The auto allocation policy table 100 may comprise a plurality of entries. Each entry may include an index value to be matched against an input index value and an allocation policy or policies to be assigned to files having a matching input index value. Any file attributes may be used as the input index into the table, in various embodiments. For example, the file name suffix (which is often used to indicate the type of data in the file) may be used. In other embodiments, other portions of the file name may be used. In still other embodiments, the file size may be used. In yet other embodiments, the owner or creator of a file may be used. If a matching index value in the table is found (a "hit"), then the corresponding allocation policy specified in the table may be assigned to the file.

Figure 14:
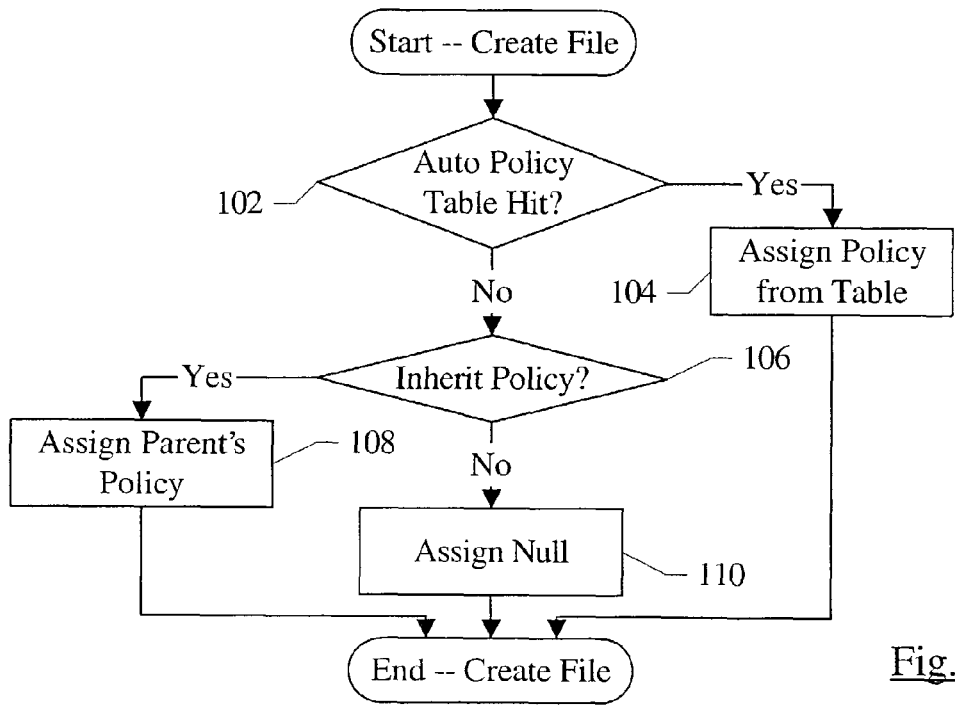
FIG. 14 is a flowchart illustrating one embodiment of activities included in creating a file.

FIG. 14 is a flowchart illustrating operation of one embodiment of the allocator 20 in response to a request to create a file. The flowchart of FIG. 14 may represent instructions forming the allocator 20 which, when executed, implement the operation shown in FIG. 14.

The allocator 20 may determine if the file is a hit in the auto policy table 100 (decision box 102). If so (decision box 102, "yes" leg), the allocation policy or policies for the file are assigned from the auto policy table 100 (box 104). If not (decision box 102, "no" leg), the allocator 20 may determine if the file is to inherit an allocation policy or policies from a parent (e.g. directory, fileset, or filesystem) (decision box 106). For example, the filesystem 14 may be programmable to provide inheritance of allocation policies. Alternatively, whether or not inheritance is provided may be specifiable at other levels of granularity (e.g. fileset, directory, etc.). Other embodiments many not implement inheritance. If the file is to inherit an allocation policy (decision box 106, "yes" leg), the allocator 20 may assign the parent's policy or policies (box 108). If the file is not to inherit an allocation policy (decision box 106, "no" leg), the allocator 20 may assign a null policy or policies to the file. Alternatively, the fileset allocation policy or filesystem allocation policy may be assigned at box 106, if desired.

Examples of Allocation Policy Use

The allocation policies may be used in many ways to achieve various allocations of files to volumes in a filesystem. The examples provided below are not meant to be exhaustive.

One application may be to assign the files in a given checkpoint to one or more volumes. Such an assignment may permit the administrator of the filesystem to limit the space used by a checkpoint, and it may also prevent the checkpoint from fragmenting the space in the primary fileset. Multiple checkpoints might be assigned to the same volume as well. For this application, the filesystem may initially have one fileset (the primary fileset), having an allocation policy that includes one volume. A new allocation policy including a different volume may be created, and a checkpoint fileset may be created that has the new allocation policy assigned to it.

Another application may be to separate file data from metadata. As mentioned previously, metadata is often considered to be more valuable than file data. Thus, it may be desirable to store metadata on a volume with greater reliability characteristics than file data, and even to allow different levels of reliability for different classes of metadata. For this application, the file data modes may be assigned a first allocation policy including a first one or more volumes, and metadata inodes may be assigned a second allocation policy including a second one or more volumes that does not overlap with the first one or more volumes. The second volumes may have higher reliability characteristics than the first volumes. If different levels of reliability are desired for different classes of metadata, additional allocation policies may be created.

Yet another exemplary application may be to store a filesystem intent log on a different physical storage device than other files. Some filesystems (e.g. the VERITAS File System™ from VERITAS Software Corporation, Mountain View, Calif.) may include an intent log used to record the intent to modify various filesystem data. If the system crashes before all the modifications are complete, the intent log may be used to detect what should have been updated and either complete the updates or undo the updates. Putting the intent log (which is updated frequently) on a separate physical storage device than other files may prevent frequent seeking on the devices (between the intent log and other files) and may also prevent fragmenting volumes with intent log data blocks.

For this application, an allocation policy specifying a single volume (or volumes) to be used for the intent log may be created, and may be assigned to the intent log modes. Other allocation policies may not use the volume or volumes used for the intent log. A similar mechanism may be used to isolate other logs on their own physical disks (e.g. a file change log implemented by the VERITAS File System™, which records changes to files).

Database software (such as Oracle) often uses a raw volume to store its data (e.g. managing the block allocations itself). Backing up the database volume may be complicated, since the raw volume doesn't contain any files, and it may be time consuming to copy the data from the volume to a file to back up the file. For this application, the encapsulate command may be used to add the raw volume to the file system and to encapsulate the volume into a file.

Some files may have an associated "name stream" structure. The name stream may be used to store other information about a file (e.g. the icon that goes with a file, etc.). It may be desirable to store the name stream in a different volume than the file data. For this application, the name stream inode(s) may be assigned a different allocation policy than the file data inode(s).

More generally, it may be desirable to store different files on different volumes based on user-defined criteria. For example, some files (e.g. multimedia files) may have different access patterns than other files. It may be desirable to store such files on volumes that perform better for those types of access patterns. The user may be permitted to assign allocation policies to files to accomplish the desired allocations. In some embodiments, allocation policies may have a flag indicating whether or not non-privileged users have access to a given allocation policy. Such a flag may permit the administrator to control which allocation policies a user may use.

In other embodiments, additional administrative controls may be implemented. Additional administrative controls may permit more flexibility in permitting certain users or groups of users to define allocation policies, assign allocation policies to files, etc.

Another example may be to permit a filesystem larger in size than a maximum size of a single volume. For this example, multiple volumes may be attached to the filesystem and the allocation policy for the filesystem may be to allocate files on any available volume.

Computer Accessible Medium

Figure 15:
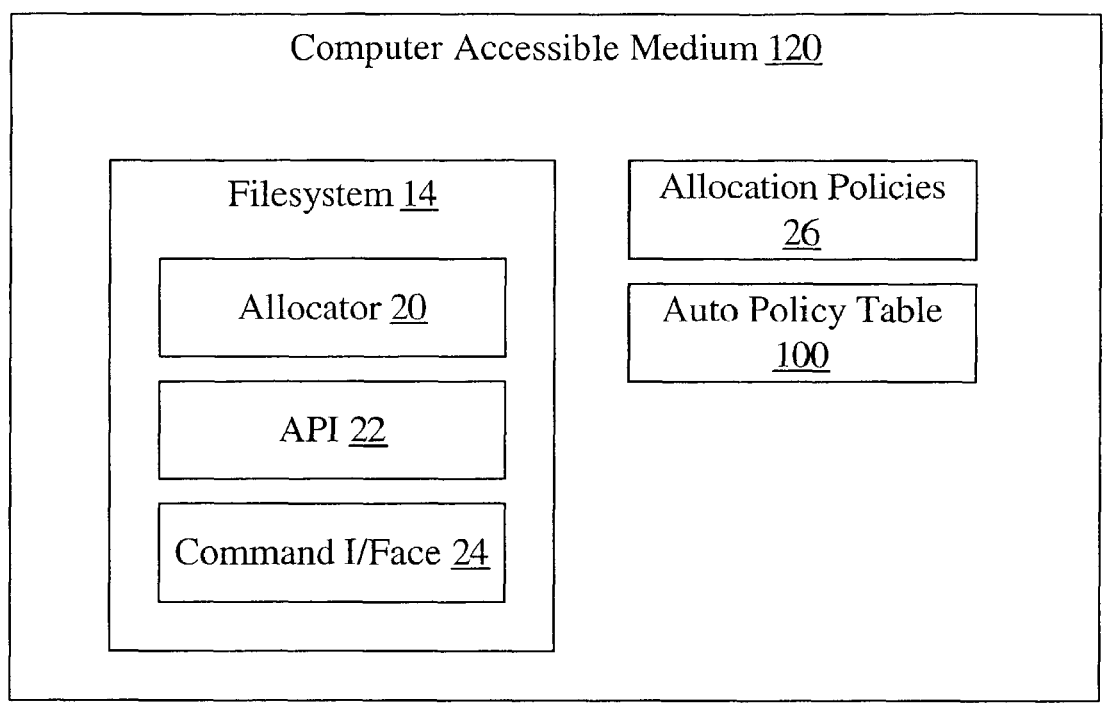
FIG. 15 is a block diagram of one embodiment of a computer accessible medium.

Turning now to FIG. 15, a block diagram of a computer accessible medium 120 is shown. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link. The computer accessible medium 120 in FIG. 15 may store one or more of the filesystem software 14 (e.g. including the allocator 20, the API 22, and/or the command interface 24), the allocation policies 26, and the auto policy table 100.

Numerous variations and modifications will become apparent to those skilled in the art once the above disclosure is fully appreciated. It is intended that the following claims be interpreted to embrace all such variations and modifications.

What is claimed is:

1. A computer accessible medium comprising instructions which, when executed:
   determine if an automatic assignment of at least one allocation policy is specified during creation of a file;
   assign the allocation policy in response to determining that the automatic assignment is specified;
   receive a request to allocate one or more blocks for the file, wherein the allocation policy is assigned to the file, and wherein the allocation policy specifies one or more storage units on which the blocks are to be allocated and, if more than one storage unit is specified, the allocation policy further comprises a control indication indicating a mechanism for selecting among the storage units;
   select at least one selected storage unit among the storage units according to the control indication; and
   allocate blocks on the at least one selected storage unit according to the allocation policy.

2. The computer accessible medium as recited in claim 1 wherein an inode of the file specifies the allocation policy.

3. The computer accessible medium as recited in claim 2 wherein the inode specifies a first allocation policy used for indirect block requests and a second allocation policy used for data block requests, and wherein the request includes an indication of whether the request is for indirect blocks or data blocks, and wherein the instructions, when executed, select either the first allocation policy or the second allocation policy dependent on the indication.

4. The computer accessible medium as recited in claim 1 wherein the instructions, when executed, check a fileset allocation policy corresponding to a fileset including the file if the allocation policy is null.

5. The computer accessible medium as recited in claim 4 wherein the instructions, when executed, check a filesystem allocation policy corresponding to a filesystem including the fileset if the fileset allocation policy is null.

6. The computer accessible medium as recited in claim 5 wherein the instructions, when executed, use a default allocation policy if the filesystem allocation policy is null.

7. The computer accessible medium as recited in claim 1 wherein the instructions, when executed, check a directory allocation policy corresponding to a directory including the file if the allocation policy is null.

8. The computer accessible medium as recited in claim 1 wherein determining if the automatic assignment is specified includes checking a table of file attributes and corresponding allocation policies.

9. The computer accessible medium as recited in claim 8 wherein the file attributes comprises file name suffixes.

10. The computer accessible medium as recited in claim 8 wherein the file attributes comprise a file size.

11. The computer accessible medium as recited in claim 1 wherein the storage units comprise volumes.

12. The computer accessible medium as recited in claim 1 wherein the control indication indicates that the storage unit is to be selected in the order given in the allocation policy.

13. The computer accessible medium as recited in claim 1 wherein the control indication indicates that the storage unit is to be selected as the least full storage unit specified in the allocation policy.

14. The computer accessible medium as recited in claim 1 wherein the control indication indicates that the storage units are to be scanned to locate a minimum sized extent and the storage unit having the minimum sized extent is to be selected, and if the minimum sized extent is not found, the storage unit is to be selected in the order given in the allocation policy.

15. A computer-implemented method comprising:
   receiving a request to allocate one or more blocks for a file, wherein at least one allocation policy is assigned to the file, and wherein the allocation policy specifies one or more storage units on which the blocks are to be allocated and, if more than one storage unit is specified, the allocation policy further comprises a control indication indicating a mechanism for selecting among the storage units;
   selecting at least one selected storage unit among the storage units according to the control indication;
   allocating blocks on the at least one selected storage unit according to the allocation policy; and
   changing the allocation policy assigned to the file, wherein the allocation is responsive to the allocation policy in effect at the time the allocating occurs.

16. The method as recited in claim 15 wherein an inode of the file specifies the allocation policy.

17. The method as recited in claim 16 wherein the inode specifies a first allocation policy used for indirect block requests and a second allocation policy used for data block requests, and wherein the request includes an indication of whether the request is for indirect blocks or data blocks, and wherein the method further comprises selecting either the first allocation policy or the second allocation policy dependent on the indication.

18. A method comprising:
   generating one or more allocation policies for use in a filesystem, wherein an allocation policy controls allocation of filesystem data to a plurality of storage units associated with the filesystem, wherein each allocation policy specifies one or more of the plurality of storage units and, if more than one storage unit is specified in the allocation policy, the allocation policy further comprises a control indication indicating a mechanism for selecting among the storage units;
   automatically assigning allocation policies to filesystem data during creation of the filesystem data; and
   allocating blocks according to the allocation policies to store the filesystem data, wherein the allocating includes selecting among storage units according to the control indication.

19. The method as recited in claim 18 wherein the one or more of the plurality of storage units specified in a given allocation policy have one or more storage characteristics, whereby allocation of certain filesystem data is correlated to the one or more storage characteristics.

20. The method as recited in claim 19 wherein the one or more storage characteristics comprise a performance characteristic of the storage units.

21. The method as recited in claim 19 wherein the one or more storage characteristics comprise a reliability characteristic of the storage units.

22. The method as recited in claim 19 wherein the one or more storage characteristics comprise at least a first storage characteristic assigned to a storage unit.

23. The method as recited in claim 19 wherein a first storage characteristic is assignable by an administrator.

24. The method as recited in claim 18 wherein the filesystem data comprises a primary fileset and at least one other fileset, and wherein the assigning allocation policies comprises assigning a first allocation policy to the primary fileset and a second allocation policy to the other fileset.

25. The method as recited in claim 24 wherein the first allocation policy specifies a first one or more of the plurality of storage units and the second allocation policy specifies a second one or more of the plurality of storage units excluding the first one or more of the plurality of storage units.

26. The method as recited in claim 18 wherein the filesystem data includes file data and metadata, and wherein the assigning allocation policies comprises assigning a first allocation policy to the file data and a second allocation policy to the metadata.

27. The method as recited in claim 26 wherein the first allocation policy specifies a first one or more of the plurality of storage units and the second allocation policy specifies a second one or more of the plurality of storage units, and wherein the second one or more of the plurality of storage units have greater reliability characteristics than the first one or more of the plurality of storage units.

28. The method as recited in claim 18 wherein the filesystem includes one or more logs, and wherein the assigning allocation policies comprises assigning a first allocation policy to the one or more logs and assigning other ones of the plurality of allocation policies to other filesystem data.

29. The method as recited in claim 28 wherein the first allocation policy specifies a first one or more of the plurality of storage units, and a second allocation policy included in the other ones of the plurality of allocation policies, and wherein the second allocation policy specifies a second one or more of the plurality of storage units excluding the first one or more of the plurality of storage units.

30. The method as recited in claim 28 wherein the one or more logs comprises an intent log.

31. The method as recited in claim 28 wherein the one or more logs comprises a file change log.

32. The method as recited in claim 18 wherein the filesystem data comprises a name stream and corresponding file data, and wherein the assigning allocation policies comprises assigning a first allocation policy to the name stream and a second allocation policy to the corresponding file data.

33. The method as recited in claim 18 wherein the storage units comprise volumes, and wherein a first allocation policy causes allocation on any of the volumes.

34. The method as recited in claim 18 the generating comprises applying one or more administrative controls to one or more of the plurality of allocation policies.

* * * * *